Nov. 18, 1969  J. J. GAZALSKI  3,478,459
DECOY
Filed Aug. 14, 1968
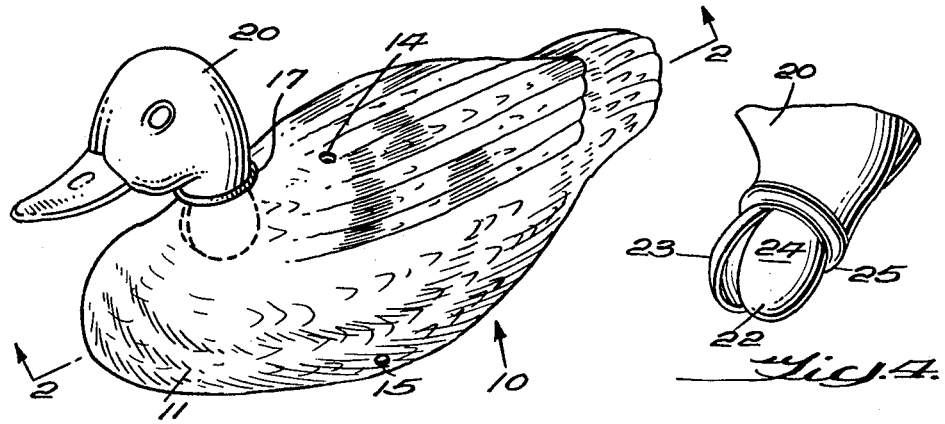
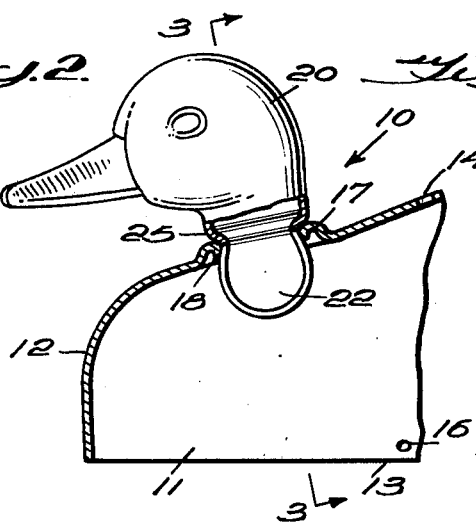
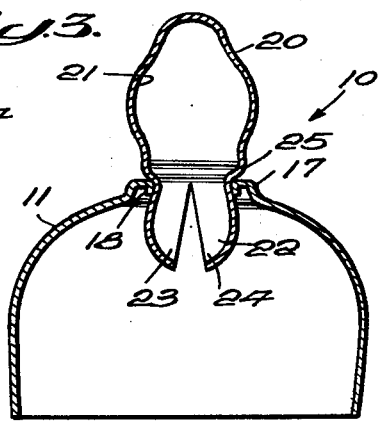
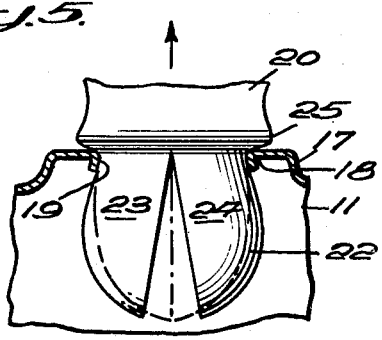
INVENTOR
JOHN J. GAZALSKI,
BY Kimmel, Crowell & Weaver
ATTORNEYS

United States Patent Office 3,478,459
Patented Nov. 18, 1969

3,478,459
DECOY
John J. Gazalski, P.O. Box 937,
Henryetta, Okla. 74437
Filed Aug. 14, 1968, Ser. No. 752,587
Int. Cl. A01m *31/06*
U.S. Cl. 43—3          4 Claims

ABSTRACT OF THE DISCLOSURE

A decoy has a plastic shell body formed with a flanged opening. A hollow head member has a depending bulbous bifurcated neck portion which is compressible and is snap-fitted in the opening to provide a swivel connection between the body and head.

---

The present invention relates to decoys of the general type disclosed in Patents 2,011,480 and 2,536,736. In this type decoy, the body is a hollow shell which is supported on a crossbar and stake so that it can be supported in the shallow water adjacent to a duckblind. The head and neck is usually removable to permit interfitting stacking of the bodies of the decoys when shipping the decoys.

In the present invention, the decoy is provided with a swivel head which is snapped into position by compressing the slotted neck portion to permit it to pass through an opening in the body and clamp the head in place on the body.

The primary object of the invention is to provide a decoy of the type described above which can be disassembled by removing the head from the body to permit easy interfitting in packing for shipping and storage.

Another object of the invention is to provide a decoy of the class described above which is inexpensive to manufacture, easy to assemble, and in which the head can be easily swiveled to give the decoy a more life-like appearance.

Other objects and advantages will become apparent in the following specification when considered in light of the attached drawings.

DESCRIPTION OF DRAWINGS

FIGURE 1 is a perspective view of the decoy;

FIGURE 2 is an enlarged fragmentary vertical cross-section taken along the line 2—2 of FIGURE 1 looking in the direction of the arrows;

FIGURE 3 is a transverse cross-section taken along the line 3—3 of FIGURE 2 looking in the direction of the arrows;

FIGURE 4 is a fragmentary perspective view of the neck portion of the decoy; and FIGURE 5 is an enlarged fragmentary view similar to FIGURE 3 illustrating the connection between the head and the body.

Referring now to the drawings in detail wherein like reference characters indicate like parts throughout the several figures, the reference numeral 10 indicates generally a decoy constructed in accordance with the invention.

The decoy 10 includes a body 11 which is shaped to simulate the body of a duck or other bird, such as a goose and the like, and consists of a relatively thin molded plastic shell 12 which has an open bottom 13 as can be seen in FIGURES 3 and 2. The body 11 has an opening 14 formed in the back thereof intermediate the sides to receive a supporting stake (not shown). A pair of oppositely disposed openings 15, 16 are formed in the sides of the body 11 to receive a crossbar (not shown) which assists in supporting the decoy 10. The stake and crossbar mounting of the decoy 10 is the same as the stake and crossbar mounting illustrated in Patent 2,011,480.

The body 11 is provided with an upstanding ring 17 adjacent the forward end of the body with the ring 17 terminating in a circular reverted inwardly projecting flange 18 forming an opening 19 as can be seen in FIGURE 5. The ring 17 and flange 18 form a rather rigid structure surrounding the opening 19.

A head 20 is shaped similar to the head of the fowl, the decoy 10 is designed to simulate, and it too is formed of a relatively thin plastic wall 21 similar in nature to the plastic shell 12. The head 20 is hollow and has a depending bulbous bifurcated neck 22 including a pair of opposite side portions 23, 24. The neck 22 is flexible so that the opposite portions 23, 24 can be moved into abutting relation as shown by the dotted lines in FIGURE 5 to permit the neck 22 to be withdrawn through the opening 19 when removing the head 20 or replacing it on the body 11. With the neck 22 pressed completely within the body 11, an annular enlargement 25 on the head 20 comes into engagement with the ring 17 to prevent further movement of the neck 22 into the body 11. In this position, the opposite side portions 23, 24 move into their normal position in spread apart relation as can be seen in FIGURES 3 and 5 so that the bulbous opposite side portions 23, 24 engage under the annular flange 18 to detachably secure the head 20 to the body 11.

Obviously, the head 20 can be swiveled within the opening 19 to any desired angular relation so as to give a life-like appearance to the decoy 10.

Having thus described the preferred embodiment of the invention, it should be understood that numerous structural modifications and adaptations may be resorted to without departing from the spirit of the invention.

I claim:

1. A decoy comprising
   a hollow body formed of a relatively thin plastic shell,
   an upstanding ring integrally formed on said body adjacent the forward end thereof,
   an annular reverted depending flange integrally formed on said ring and forming a circular opening in said body,
   a hollow pastic head, and
   a bifurcated neck integrally formed on the lower end of said head engaging through the opening formed by said flange and detachably securing said head to said body.

2. The device as claimed in claim 1 wherein said bifurcated neck includes a pair of bulbous opposite side portions adapted to engage under said flange with said head assembled to said body.

3. The device as claimed in claim 2 wherein said head is provided with an annular enlargement overlying said neck to restrict the movement of said neck into said body.

4. The invention as set forth in claim 3 wherein said opposite side portions are flexibly disposed with respect to each other and are adapted to be moved into abutting relation for disengaging said head from said body.

References Cited

UNITED STATES PATENTS

| | | | |
|---|---|---|---|
| 351,709 | 10/1886 | Nye | 43—3 |
| 364,573 | 6/1887 | Brinkop | 43—3 |
| 1,544,084 | 6/1925 | Wiener | 46—173 |
| 2,274,246 | 2/1942 | Riddell | 43—3 |
| 3,273,280 | 9/1966 | Karton | 46—173 X |

WARNER H. CAMP, Primary Examiner